US008596879B2

(12) United States Patent
Budd et al.

(10) Patent No.: US 8,596,879 B2
(45) Date of Patent: Dec. 3, 2013

(54) METHOD TO REORDER (SHUFFLE) OPTICAL CABLE WAVEGUIDE LAYERS

(75) Inventors: Russell A. Budd, North Salem, NY (US); Frank R. Libsch, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/277,767

(22) Filed: Oct. 20, 2011

(65) Prior Publication Data

US 2013/0044979 A1 Feb. 21, 2013

Related U.S. Application Data

(60) Provisional application No. 61/525,390, filed on Aug. 19, 2011.

(51) Int. Cl.
*G02B 6/38* (2006.01)

(52) U.S. Cl.
USPC .............................. 385/59; 359/663; 264/1.25

(58) Field of Classification Search
USPC ...................... 385/33, 59; 359/663; 264/1.25
See application file for complete search history.

(56) References Cited

U.S. PATENT DOCUMENTS

| | | | | |
|---|---|---|---|---|
| 4,210,773 A | * | 7/1980 | Haley et al. | 174/72 A |
| 4,869,570 A | * | 9/1989 | Yokohama et al. | 385/24 |
| 4,900,126 A | * | 2/1990 | Jackson et al. | 385/114 |
| 5,274,917 A | * | 1/1994 | Corbett et al. | 29/860 |
| 5,518,418 A | * | 5/1996 | Larabell | 439/505 |
| 5,715,345 A | * | 2/1998 | McKinley | 385/115 |
| 6,185,348 B1 | * | 2/2001 | Shahid | 385/49 |
| 6,222,976 B1 | * | 4/2001 | Shahid | 385/134 |
| 6,224,269 B1 | * | 5/2001 | Engstrand et al. | 385/59 |
| 6,269,210 B1 | * | 7/2001 | Yagi et al. | 385/114 |
| 6,464,404 B1 | * | 10/2002 | Robinson et al. | 385/54 |
| 6,498,882 B1 | * | 12/2002 | Buckelew et al. | 385/114 |
| 6,549,710 B2 | * | 4/2003 | Simmons et al. | 385/121 |
| 6,690,867 B2 | * | 2/2004 | Melton et al. | 385/114 |
| 6,832,032 B2 | * | 12/2004 | Simmons et al. | 385/121 |
| 6,850,671 B2 | * | 2/2005 | Carnevale et al. | 385/39 |
| 7,139,456 B2 | * | 11/2006 | Sasaki et al. | 385/114 |
| 7,509,009 B2 | * | 3/2009 | Suzuki et al. | 385/114 |
| 8,068,715 B2 | * | 11/2011 | Kewitsch | 385/147 |
| 2002/0015563 A1 | * | 2/2002 | Murakami et al. | 385/53 |
| 2003/0031452 A1 | * | 2/2003 | Simmons et al. | 385/147 |
| 2003/0044141 A1 | * | 3/2003 | Melton et al. | 385/114 |
| 2003/0087505 A1 | * | 5/2003 | Deane | 438/422 |
| 2003/0174953 A1 | * | 9/2003 | Carnevale et al. | 385/39 |

(Continued)

*Primary Examiner* — Charlie Peng
*Assistant Examiner* — Peter Radkowski
(74) *Attorney, Agent, or Firm* — Scully, Scott, Murphy & Presser, P.C.; Daniel P. Morris, Esq.

(57) ABSTRACT

An optical cable including connectors includes a plurality of waveguide layers each including a plurality of optical channels each having a first end and a second end. First and second connectors each include a plurality of electrically conductive pins, and each of the plurality of optical channels of each of the waveguides, at their first and second ends, are connected to a specified pin on each of the first and second connectors, respectively. A first optical channel connection pattern on the first connector, and a second optical channel connection pattern on the second connector. The first optical channel connection pattern on the first connector is a different pattern than the second optical channel connection pattern on the second connector in relation to a connection hole pattern which is the same for both the first and second connectors.

9 Claims, 6 Drawing Sheets

(56) References Cited

U.S. PATENT DOCUMENTS

| | | | |
|---|---|---|---|
| 2007/0217750 A1* | 9/2007 | Budd et al. | 385/89 |
| 2008/0217778 A1* | 9/2008 | Buchwalter et al. | 257/753 |
| 2008/0226241 A1* | 9/2008 | Sugizaki et al. | 385/114 |
| 2009/0097797 A1* | 4/2009 | Kewitsch | 385/17 |
| 2010/0316334 A1* | 12/2010 | Kewitsch | 385/78 |
| 2012/0321255 A1* | 12/2012 | Kewitsch | 385/78 |

* cited by examiner

METHOD TO REORDER (SHUFFLE) OPTICAL CABLE WAVEGUIDE LAYERS

CROSS REFERENCE TO RELATED APPLICATION

This application claims the benefit under 35 U.S.C. §119(e) of the filing date of U.S. Provisional Patent Application No. 61/525,390, filed Aug. 19, 2011, the disclosure of which is incorporated herein by reference in its entirety.

FIELD OF THE INVENTION

The present invention generally relates to optical cables and a method of manufacture thereof, and more particularly, includes an optical cable having waveguide layer.

BACKGROUND

Optical data communications technology has a number of advantages over wire technology, such as increased bandwidth, data rate and response characteristics superior to those of conventional wire technology. Also, optical technology is essentially immune to radio frequency interference (RFI) and electromagnetic interference (EMI) issues associated with wire technology. Optical data communication is therefore desirable in a variety of applications such as multi-chip modules (MCMs), printed circuit board (PCB) technologies, and integrated backplanes.

In conventional optical connectors, electronic circuitry, optical source and optical detectors are typically mounted on PCBs which are received in card guides mounted to an equipment frame. A backplane mounted to the rear of the frame includes board edge connectors aligned with the card guides and electrical conductors interconnecting the board edge connectors. The circuit boards are provided with board edge electrical contacts which are received in the board edge connectors when the circuit boards are inserted in the card guides to electrically connect the circuitry to the electrical conductors on the back plane. The electrical conductors provide the required electrical connections between circuit boards.

The circuit boards also include optical connector parts which are optically coupled to the optical sources and to the optical detectors of the receivers and transmitters. The board mounted optical connector parts must be mated with frame mounted optical connector parts to optically connect the optical sources and the optical detectors to optical fibers terminating on the frame mounted optical connectors. The optical fibers are typically a glass fiber manufactured from glass.

In the current board edge optical connector arrangements the circuit board mounted optical connector parts are mounted at leading edges of the circuit boards. One disadvantage of this arrangement is that the leading edges are already congested with board edge electrical contacts. In addition, in the board edge optical connector arrangements the frame mounted optical connector parts are mounted at the back plane, which is already congested with electrical board edge connectors and electrical conductors. In current systems, optical fibers may be left to hang loose between packs or bundles of fibers which tend to create a messy ("rat's nest") entanglement of fibers. Further, what is needed is a method to reorder the layers within an optical cable without increasing its thickness (or bulkiness), without twisting or bending the waveguide layers, and without using optical vias.

Another approach is to use polymer waveguide optical backplanes, which can contain thousands of optical channels. A polymer waveguide may be composed of two different polymer materials, for instance, a lower index cladding material and a higher index core material. Light is guided in a core (optical channels) due to the index contrast between the core and clad regions. The optical backplane may interconnect multiple server drawers, distributing and reordering the optical channels between the drawers as necessary. To facilitate the reordering within a multi-layer optical cable, it is necessary to reorder the individual waveguide layers from the input connector to the output connector. The waveguide layer reordering may be achieved by twisting and bending individual waveguide layers. This approach can result in excessive cable bulk. Further, current waveguides are difficult to bend to achieve cable reordering of the optical fibers between two connection points. Another approach is to introduce optical vias between waveguide layers to facilitate the layer redistribution, however, optical vias introduce additional loss and are costly to fabricate. Another difficult and undesirable approach is to bend (or twist) layers to realize layer reordering.

In view of the shortcoming in the prior art, there is a need to provide an apparatus and method to connect large numbers of optical fibers to an optical backplane and avoid the entanglement of wires associated with multiple fiber-to-fiber connections and/or routing systems. Additionally, there is a need for a device and/or method of reordering the layers within an optical cable without increasing its thickness (or bulkiness), without twisting or bending the waveguide layers, and without using optical vias.

Referring to FIGS. 1-2, a prior art optical cable 10 includes four waveguides 14. Each of the waveguides 14 includes a plurality of optical fibers 22 (shown in FIG. 3) encased in a polymer such that the waveguide 14 is planar and has a defined width. Each of the waveguides 14 and optical fibers 22 have a first and a second end connected to respective first and second connectors 30, 32. Each of the first and second connectors 30, 32 include connector holes in columns and rows, or connection points, i.e., for receiving optical fibers, which may also include, for example, electrically conductive sleeves, pins, or other connection points. Each of the ends of the waveguides, i.e., the optical fiber 22 ends, correspond to waveguide connection points, collectively designated as connection points 31, 33, respectively, on the first and second connectors 30, 32. Each of the first ends of the optical fibers 22 of the waveguides 14 are connecting to columns and rows of the first connector, and each of the second ends of the optical fibers 22 of the waveguides are connected to corresponding columns and rows of the second connector. Each of the ends of the optical fibers 22 of each of the waveguides 14 are connected to specified waveguide connection points 31, 33 on each of the first and second connectors 30, 32 resulting in a connection pattern (alternatively called a pin pattern) on the first and second connectors 30, 32. The connection pattern is a geometric pattern, for example, as shown in the connectors 30, 32 of FIG. 2, which depicts a rectangular grid of connection points 31, 33 arranged in waveguide fiber columns 1-4 and rows 5a-5l, as shown in greater detail in the generic connector 75 in FIG. 5. Waveguide fiber connection points in column 1 are the outermost column on both connectors 30, 31. Rows 5a-5l, which are grouped as rows 5, form the rectangular grid of connection points 31, 33 with the columns on each of the connectors 30, 32. Each of the first and second connectors 30, 32, include four connector columns 8a, 8b, 8c, 8d, as shown in generic connector 75 in FIG. 5, from outside to inside, as shown in a generic connector 75 having connectors holes 78, shown in FIG. 5. The connection holes 78 form a connection hole pattern in one or more connectors which is identical, and is generally a grid pattern as shown in FIGS. 5 and 7.

The connector 75 of FIG. 5 is equivalent to, in the orientation of the related figures, the left side connector, for example, connectors 30, 60, 130, and its mirror image applies to the right side connectors 32, 64, 140 of the figures. However, the optical fiber column, i.e., the optical fibers at one end of each of the waveguides which correspond to the optical fibers at the other end of each of the waveguides, may be positioned in a different connector column in the opposite connector. Thus, as shown in FIG. 3, and discussed more extensively below, fiber column 1 on the first connector, corresponding to fiber column 1 on the second connector, may be physically located at a different connector column on each of the connectors 30, 31.

As shown in FIG. 2, the connection point pattern of the first connector 30 geometrically corresponds to the connection point pattern of the second connector 32. Further, the optical fiber connection pattern, i.e., the waveguide connection points 31, 33, geometrically correspond between the first and second connectors. Specifically, the first end of the same optical fiber of the same waveguide is connected to a connection point of the first connector 30 located at connector column 1, row 5a of the first connector, and the second end of the same optical fiber is connected to a connection point of the second connector 32 located at connector column 1, row 5a of the second connector, wherein the connectors have the same geometric connector pattern (or pin pattern). Thus, each optical fiber at one end of the wave guide 14 is connected to a corresponding row on the opposite connector, which also is the same physical location on the connector for each of the connectors 30, 32. Any reordering of the waveguide optical fibers is difficult due to the semi-rigid nature of the waveguides, and individual reordering of each of the optical fibers is difficult and tedious.

Referring to FIGS. 3 and 4, an alternative prior art optical cable 50 includes a wave guide 54 having optical fibers 22 connected from a first connector 60 to a second connector 64, as shown in FIG. 3. As shown in FIG. 4, first connector 60 has a different fibber connection point geometry than the second connector 64. Specifically, the second connector 64 has a fiber connection point 66 fiber column sequence of 2, 1, 4, 3, from outside to inside, opposed to the first connector 60 having a fiber connection point 62 fiber column sequence of 1, 2, 3, 4. Thus, the second connector 64 does not have the same waveguide fiber connection column geometry as the first connector 60. In the optical cable 50 shown in FIG. 3, an optical fiber 22 is shown individually connected at one end to connector column 1 on the first connector 60, and to connector column 1 on the second connector 64. As can be seen, the optical fiber in fiber row 1 of the first connector 60, corresponds to connector hole row 8a, and fiber row 1 is shifted to connector hole row 8b in the second connector 64. As shown in FIG. 4, on the second connector 64, fiber column 1, at physical location connector column 8b, corresponds to fiber column 1 on the first connector 60, at physical location connector column 8a. This is because, for example, one end of the optical fibers 22 (thereby one end of a waveguide) are connected to connection points at connector column 8a of the first connector 60, thereby being designated as fiber column 1, and the other end of the same optical fibers 22 (thereby the opposite end of the waveguide) are connected to connection points at column 8b on the second connector 64, which is designated as fiber column 1 for the second connector 64, which is physically shifted over one column, that is connector column 8b, from outside to inside of the second connector 64. Therefore, the fiber 22 connected at column 1 on the first connector 60, is connected to column 1 on the second connector 64, however, column 1 on the second connector 64 is physically located where column 2 is on the first connector 60.

BRIEF SUMMARY OF THE INVENTION

An optical cable including connectors includes a plurality of waveguides each including a plurality of optical channels encased in a polymer, and each of the waveguides and optical channels have a first end and a second end. First and second connectors each include a plurality of electrically conductive pins, and each of the plurality of optical channels of each of the waveguides, at their first and second ends, are connected to a specified pin on each of the first and second connectors, respectively. A first optical channel connection pattern on the first connector is formed by the first ends of the optical channels of the plurality of waveguides which are connected to the first connector. A second optical channel connection pattern on the second connector is formed by the second ends of the optical channels of the plurality of waveguide layers which is connected to the second connector. The first optical channel connection pattern on the first connector is a different pattern than the second optical channel connection pattern on the second connector in relation to a connection hole pattern which is the same for both the first and second connectors.

BRIEF DESCRIPTION OF THE SEVERAL VIEWS OF THE DRAWINGS

Objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 5:
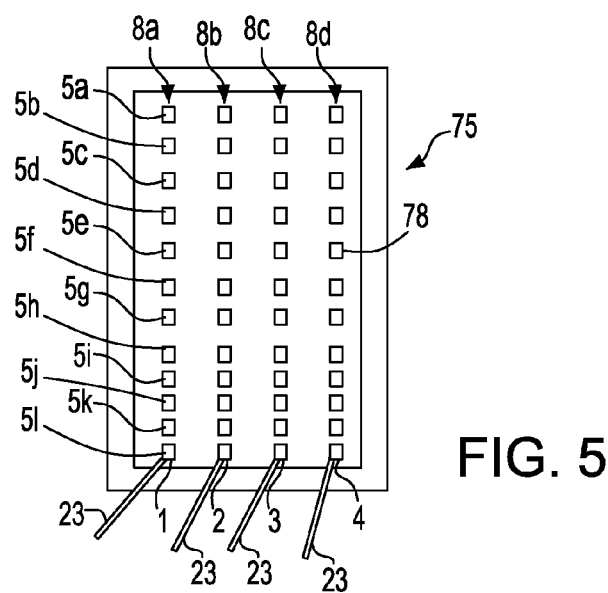
FIG. 5 is a plan view of a generic connector showing in detail, depicting the connector hole pattern and optical channel connection points therein.
Figure 6:
FIG. 6 is a side elevational view of an optical cable according to an embodiment of the invention which includes waveguides connected to connectors at each of their ends.
Figure 7:
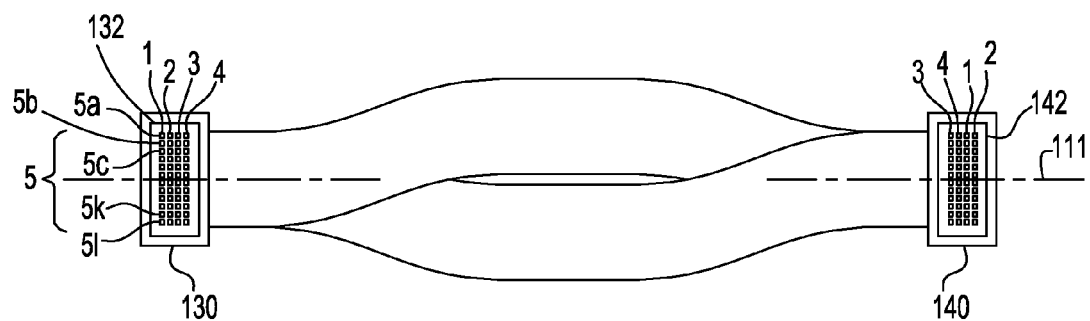
FIG. 7 is a plan view of the optical cable shown in FIG. 6.
Figure 14:
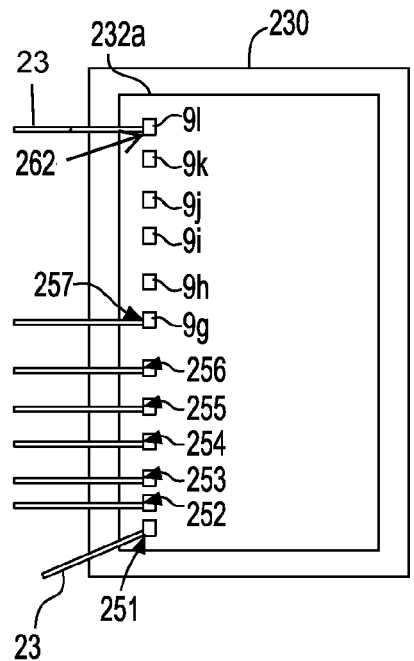
FIG. 14 is a plan view of a generic connector showing in detail, depicting the connector hole pattern and optical channel connection points therein.
Figure 15:
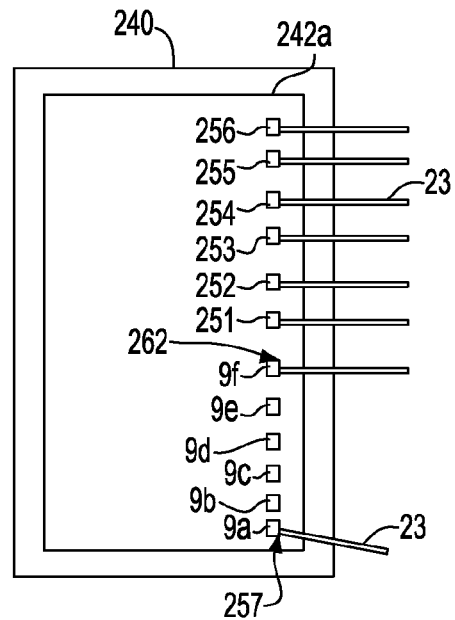
FIG. 15 is a plan view of an opposing generic connector for a waveguide in relation to the connector shown in FIG. 14, depicting the connector hole pattern and optical channel connection points therein.

Referring to FIGS. 5-7, an optical cable 100 according to one embodiment of the invention is shown which includes the same reference numerals for like elements as shown in FIGS. 1-4. The optical cable 100 comprises four waveguides 112, 114, 116, 118 (shown in FIGS. 6 and 7), and also may be referred to as waveguide flex, or waveguide flex cable, are collectively referred to as waveguides 110. Each of the waveguides 110 flex, and include a plurality of optical channels 23 (shown in FIGS. 5, 14 and 15) encased in a polymer such that the waveguide is planar and has a defined width. A polymer waveguide flex cable may be substantially plastic, and may include multiple optical channels. A waveguide layer of the polymer waveguide flex cable may be composed of two different polymer materials as discussed above, such as a lower index cladding material and a higher index core material, wherein light is guided in the core (optical channels) due to the index contrast between the core and clad regions. The optical channels 23 are shown in FIGS. 5, 14 and 15 for illustrative purposes.

Figure 8:
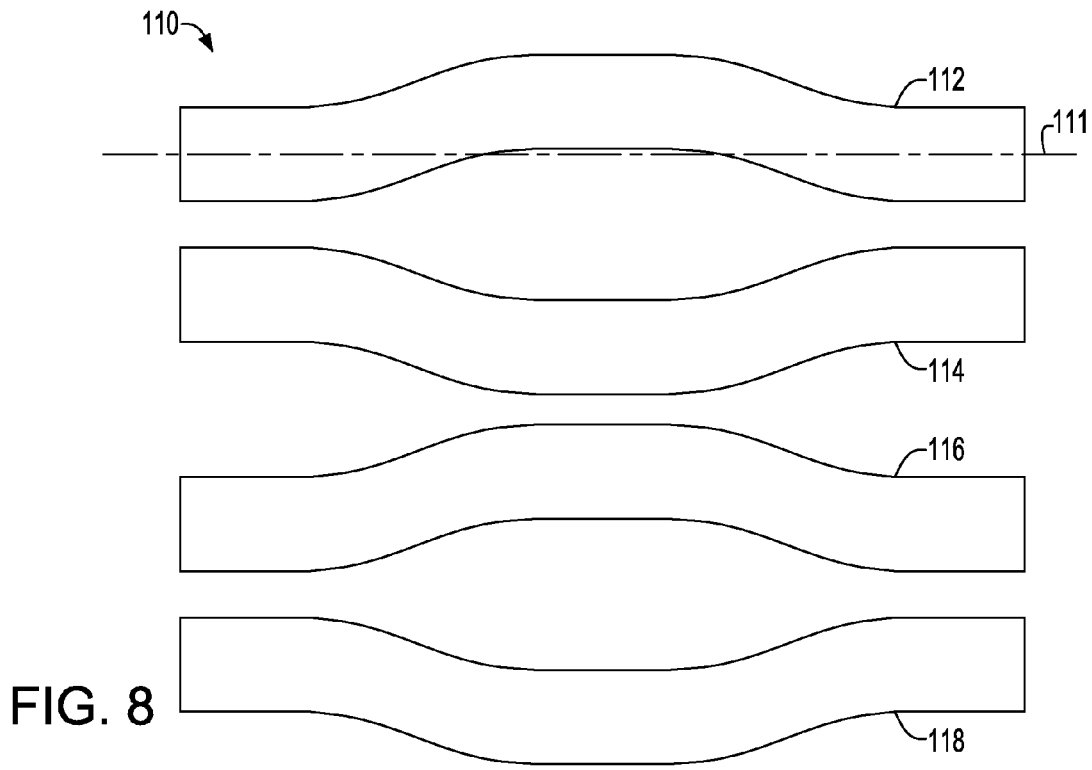
FIG. 8 is a plan view of the separated waveguides shown in FIGS. 6 and 7.

Each of the waveguides 110 are molded to have a center portion which is off center from a longitudinal axis passing through both ends of the waveguides 110. This is illustratively shown in FIG. 8, for waveguide 112 which has an axis 111 extending longitudinally through the center of both ends of the waveguide 112, but a center portion of the waveguide 112 is off center in relation to the axis 111. Waveguide 114 is in mirror image relation to waveguide 112. Similarly for the remaining waveguides 116, 118, are in minor image relation as waveguides 112, 114. In this way, the route of each waveguide is altered, and the waveguides may be overlaid and interweaved or interwoven to be juxtapositioned as shown in FIG. 7, which depicts the longitudinal axis 111 passing through substantially the center of the first and second connectors 130, 140.

Each of the waveguides 110 and optical channels 23 have a first and a second end, connected to respective first and second connectors 130, 140. Each of the first and second connectors 130, 140 include a plurality of connection points 132, 142. Each of the first ends of the optical channels 23 of the waveguides 110 are connecting to columns and rows of the first connector 130, and each of the second ends of the optical channels 23 of the waveguides 110 are connected to corresponding columns and rows of the second connector 140.

More specifically, each of the optical channels 23 of each of the waveguides 110 are connected to a specified waveguide connection points on each of the first and second connectors 130, 140 resulting in a connection pattern (or pin pattern) on the first and second connectors 130, 140. The connection pattern is a geometric pattern, for example, as shown in the connectors 30 of FIG. 2, and the first connector 130 of FIG. 7, which depicts a rectangular grid of connection points arranged in columns and rows. Referring to the first connector 130, connection columns 1-4 are sequentially arranged on the first connector 130, with column 1 being the outermost column on connector 130, and column 4 being the innermost column. Rows 5a-5l, which are grouped as rows 5, form the rectangular grid of connections with the columns on the connector 130.

Figure 9:
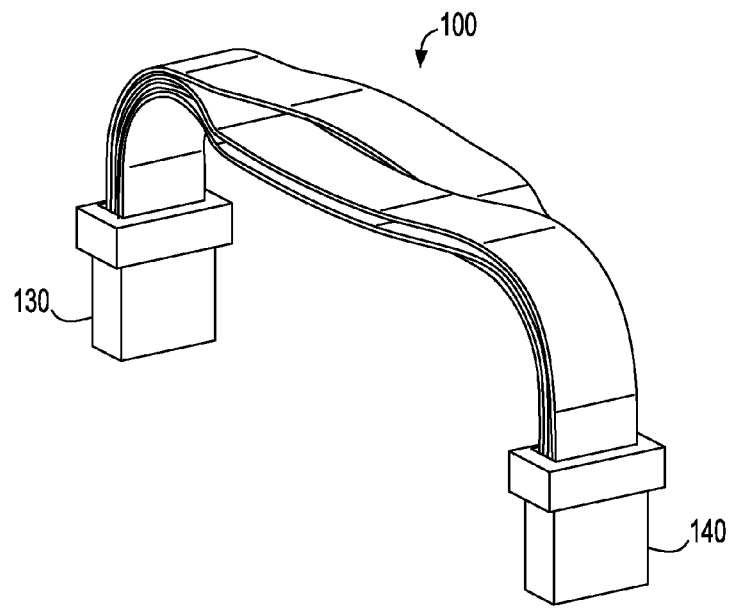
FIG. 9 is an isometric view of the optical cable shown in FIGS. 6-7.
Figure 10:
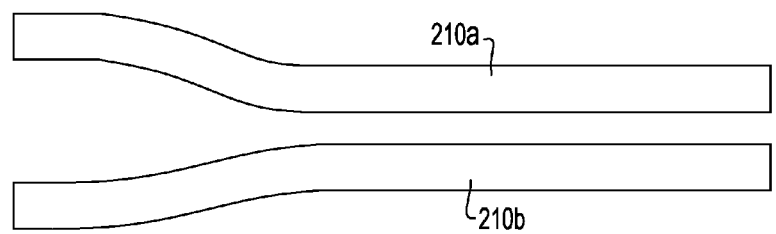
FIG. 10 is a plan view of two waveguides according to an embodiment of the invention.

Referring to FIG. 7, the waveguide layers 110 (which include waveguides 112, 114, 116, 118) are overlaid and interwoven which results in a route for each waveguide layer with which a detour along its path to the opposite connector as its center portion is off-center from its longitudinal axis, as described above. The rerouting and interweaving of the waveguide layers enable reordering of each layer to provide reordering of the connections of the optical channels at the connectors 130, 140. The resulting waveguide optical cable 100 is advantageously thin, and does not contain twists or strong bends, as can be seen in FIGS. 7 and 9.

The second connector 140 (shown in FIGS. 6 and 7) also depicts a rectangular grid of connectors arranged in columns and rows. The second connector columns 8a-8d (shown in FIG. 5) correspond to waveguide channel connection point columns 2, 1, 4, 3, respectively, from outside to inside of the connector 140. Thus, the waveguide channel connection point columns 1-4 are not the same physical order for the second connector 140, as for the first connector 130. In other words, the first and second connectors have different respective first and second orders of the waveguide channel connection point columns. As discussed above regarding FIGS. 2 and 4, the connector columns and rows correspond to holes in the connectors 130, 140, however, the waveguide channel connection column order corresponds to the ends of the optical channels for each of the waveguides, and thus can be coupled to the connector columns and rows, i.e., the holes in the connectors, in varies configurations. The connection holes form a connection hole pattern in each of the connectors 130, 140, which is the same for both connectors, and is generally a grid pattern as shown in FIG. 7.

For example, the pattern of holes 78 of columns 8a-8d on the first connector 130 and the pattern of holes of columns 8a-8d on the second connector 140 are the same, however, the connector columns 1-4, which correspond to where the ends of each of the channel of the waveguides are connected to each column of the first and second connectors, are not the same for each of the first and second connectors 130, 140. In one example, the four connector columns can be re-ordered to result in up to 24 different orders of connector columns, for example, connector columns in the following orders: 1234, 2134, 2314 . . . etc., for example, N!, wherein N=(number of rows).

Figure 1:
FIG. 1 is a side elevational view of a prior art optical cable including waveguides being connected to connectors at each of their ends.
Figure 2:
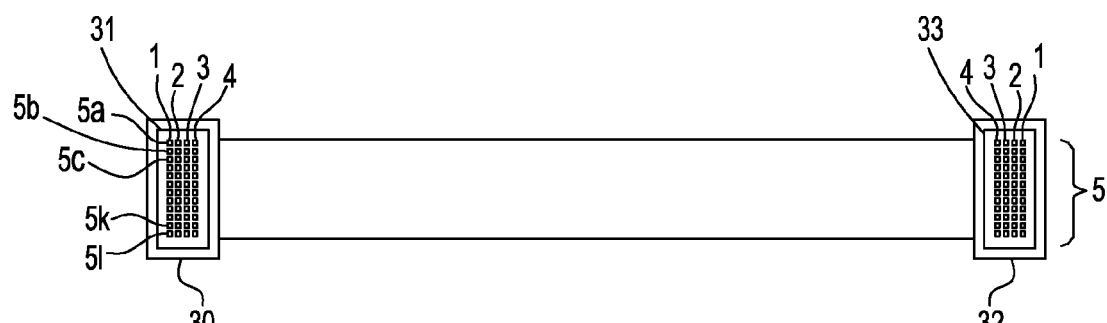
FIG. 2 is a plan view of the prior art optical cable and connectors shown in FIG. 1.
Figure 3:
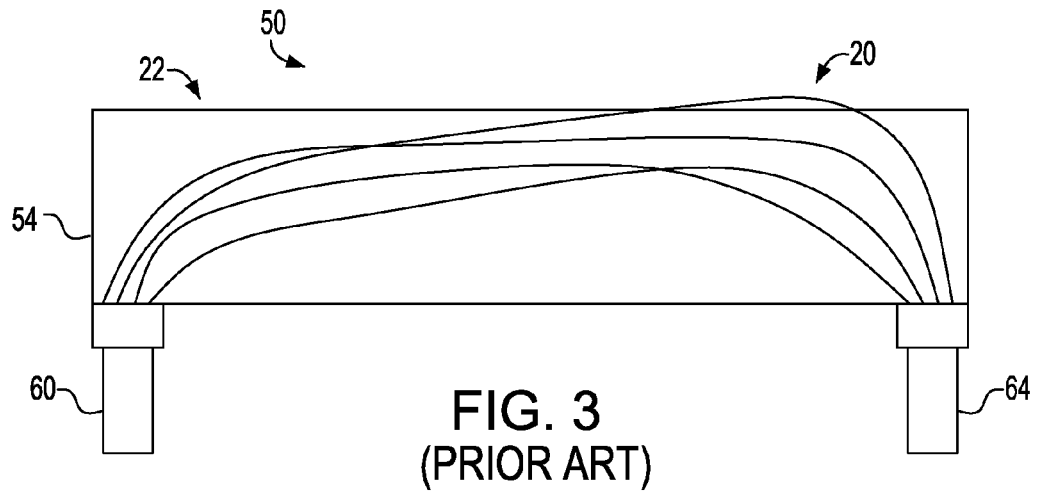
FIG. 3 is a side elevational view of another prior art optical cable wherein connection points on the connectors are different from each other.
Figure 4:
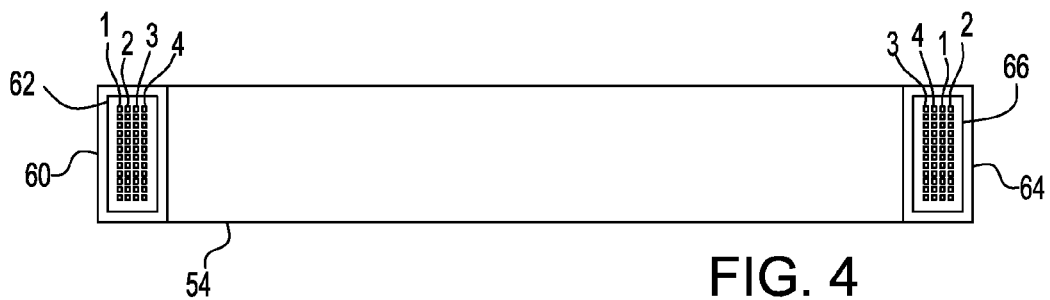
FIG. 4 is a plan view of the prior art optical cable and connectors shown in FIG. 3.

Referring to FIG. 7, the connector pattern of the first connector geometrically corresponds to the connection points of the second connector, (similarly shown in FIG. 2). In the embodiment of the invention shown in FIG. 7, the optical channel connection pattern geometrically corresponds between the first and second connectors. That is, the first end of the same optical channel of the same waveguide is connected to the connection points located at column 1, row 1 of the first connector, as the second end of the same optical channel which is connected to the connector located at column 1, row 1 of the second connector, when the connectors have the same geometric connection pattern.

Figure 11:
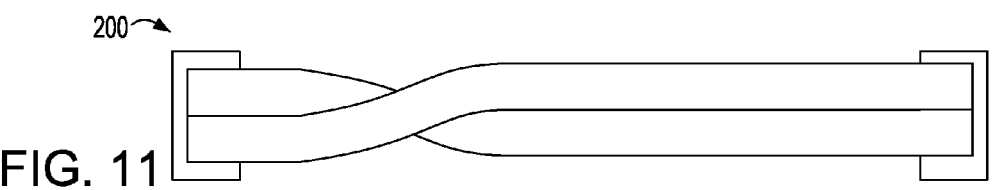
FIG. 11 is a bottom view of an optical cable according to an embodiment of the invention using the waveguides shown in FIG. 10.
Figure 12:
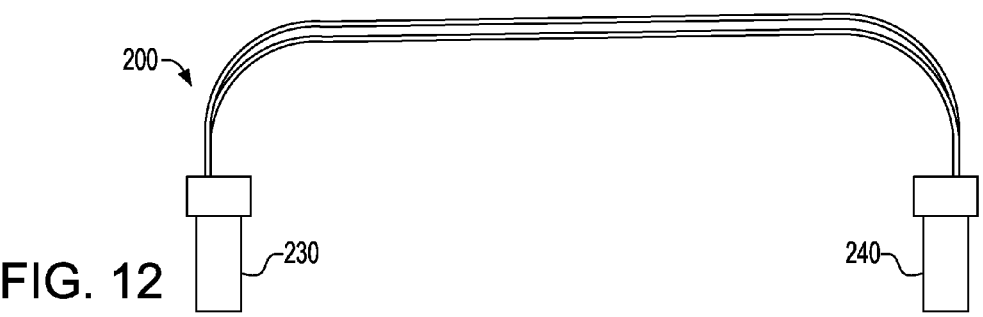
FIG. 12 is a side elevational view of the optical cable shown in FIG. 11.
Figure 13:
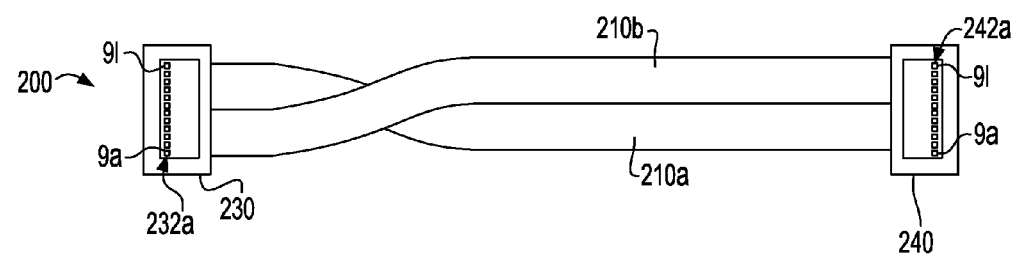
FIG. 13 is a plan view of the optical cable shown in FIGS. 11-12.

Referring to FIGS. 10-13, in another embodiment according to the disclosure wherein like elements have the same reference numerals as the previous embodiments, an optical cable 200 is shown in FIGS. 11-13. The optical cable 200 includes two waveguides (shown in FIG. 10) 210a, 210b which have a predetermined angular displacement in relation to a longitudinal axis along their lengths. The optical cable 200 is shown with two waveguides connecting to one column on each of the connector for illustrative purposes, additional waveguides and connection can be added to use four columns as in the previous embodiment of the disclosure. Each of the waveguides 210a, 201b are connected at their opposite ends to first and second connectors 230, 240, respectively. As shown in FIG. 11, the waveguides 201a, 201b cross such that the ends of the waveguides are connected to different connection points on each connector 230, 240. The first connector 230 includes connector column 232a, and the second connector 240 includes connecter column 242a.

Referring to FIGS. 14 and 15, first and second connecters 230, 240 includes connector points 9a-9l (which are labeled partially on each connector for illustrative purposes), and waveguide channel connection points 251-262. As shown in FIGS. 14 and 15, waveguide channel connection points 251-256 correspond to connection holes 9a-9f on the first connector 230. However, waveguide channel connection points 251-256, which are the opposite ends of the optical connections of waveguide 210b, correspond to connection holes 9g-9l on the second connector 240. Similarly, waveguide channel connection points 257-262 (only connection points 257 and 262 are shown for illustrative purposes) correspond to connection holes 9g-9l on the first connector 230. However, waveguide channel connection points 257-262 (only connection points 257 and 262 are shown for illustrative purposes), which are the opposite ends of the optical channels of waveguide 210a, correspond to connection holes 9a-9f on the second connector 240. Thereby, the angular displacement of the waveguides 210a, 210b enables the placement of the waveguide channel ends of the waveguides on each of the first and second connectors 230, 240 as shown in FIGS. 13-15.

Figure 16:
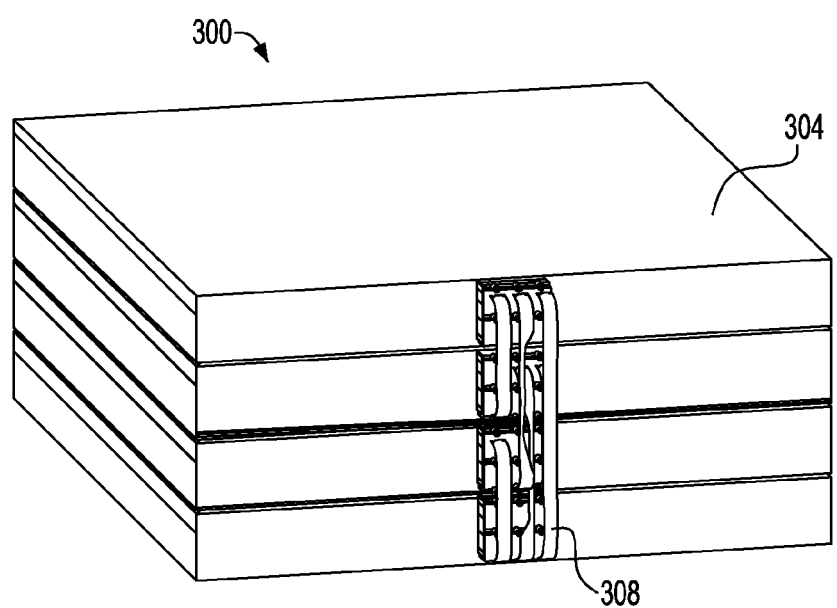
FIG. 16 is an isometric view of an optical backplane for use with the optical cables of the present disclosure.

Referring to FIG. 16, an optical backplane 300 for a high performance computer is shown which implements the present invention. The optical backplane 300 includes multiple server draws or blades 304 (or computer boards) connected by multiple optical waveguide cables (jumper cables) 308, which include thousands of optical channels for distributing and reordering the optical channels between the drawers as necessary, in accordance with the present disclosure.

One advantage of the present disclosure includes using the optical cables as disclosed above on a high performance optical backplane. A high performance optical backplane benefits from the simplified wiring of the present disclosure, by simplifying the wiring and eliminating potentially thousands of individual optical fibers.

Thereby, a method is provided for reordering any input waveguide channel location within an N×M waveguide array bundle using 2D planar waveguide lengths, connected to any output waveguide channel location, without going to a 3D structure, such as optical vias. Optical vias or pathways that interconnect the layers of a multi-layer optical flex cable are undesirable because of the additional optical loss caused by the turning minors of the optical vias. Further, in another advantage of the invention, the disclosure provided herein preserves any input channel location within a given row of waveguides (planes), but reorders row location (inter-row) while preserving the 2D planarity of each row (without going to a 3D structure, such as optical vias). Additionally, any input channel location within a row (plane) can be re-ordered (intra-row, or waveguide cross-throughs), to any output channel location while preserving the 2D plane of the row. Further, the optical cable and method disclosed herein provides a plurality of reordering options.

An example of inter-row re-ordering combinations for an optical cable as in the embodiments discussed above, is shown below in Table 1. In Table 1, the number of possible rows is designated by "n", and the input row ordering is shown in relation to possible output row ordering in the corresponding columns.

TABLE 1

Inter-Row re-ordering combinations for an example of 4 rows

| Possibilities (n! where n = # of rows) | Input row ordering | Output row ordering |
|---|---|---|
| 1 | 1 2 3 4 | 1 2 3 4 |
| 2 | 1 2 3 4 | 1 2 4 3 |
| 3 | 1 2 3 4 | 1 3 2 4 |
| 4 | 1 2 3 4 | 1 3 4 2 |
| 5 | 1 2 3 4 | 1 4 2 3 |
| 6 | 1 2 3 4 | 1 4 3 2 |
| 7 | 1 2 3 4 | 2 1 3 4 |
| 8 | 1 2 3 4 | 2 1 4 3 |
| 9 | 1 2 3 4 | 2 3 1 4 |
| 10 | 1 2 3 4 | 2 3 4 1 |
| 11 | 1 2 3 4 | 2 4 1 3 |
| 12 | 1 2 3 4 | 2 4 3 1 |
| 13 | 1 2 3 4 | 3 1 2 4 |
| 14 | 1 2 3 4 | 3 1 4 2 |
| 15 | 1 2 3 4 | 3 2 1 4 |
| 16 | 1 2 3 4 | 3 2 4 1 |
| 17 | 1 2 3 4 | 3 4 1 2 |
| 18 | 1 2 3 4 | 3 4 2 1 |
| 19 | 1 2 3 4 | 4 1 2 3 |
| 20 | 1 2 3 4 | 4 1 3 2 |
| 21 | 1 2 3 4 | 4 2 1 3 |
| 22 | 1 2 3 4 | 4 2 3 1 |
| 23 | 1 2 3 4 | 4 3 1 2 |
| 24 | 1 2 3 4 | 4 3 2 1 |

An example of intra-row re-ordering combinations for an optical cable as in the embodiments discussed above, is shown below in Table 2. In Table 2, the number of possible rows is designated by "n", and the input row ordering is shown in relation to possible output row ordering in the corresponding columns.

TABLE 2

Intra-Row re-ordering combinations for an example of 12 rows

| Possibilities (n! where n = # of rows) | Input row ordering | Output row ordering |
|---|---|---|
| 1 | 1-2-3-4-5-6-7-8-9-10-11-12 | 1-2-3-4-5-6-7-8-9-10-11-12 |
| 2 | 1-2-3-4-5-6-7-8-9-10-11-12 | 1-2-3-4-5-6-7-8-9-10-12-11 |
| 3 | 1-2-3-4-5-6-7-8-9-10-11-12 | 1-2-3-4-5-6-7-8-9-11-10-12 |
| 4 | 1-2-3-4-5-6-7-8-9-10-11-12 | 1-2-3-4-5-6-7-8-9-11-12-10 |
| 5 | 1-2-3-4-5-6-7-8-9-10-11-12 | 1-2-3-4-5-6-7-8-9-12-10-11 |
| 6 | 1-2-3-4-5-6-7-8-9-10-11-12 | 1-2-3-4-5-6-7-8-9-12-11-10 |
| 7 | 1-2-3-4-5-6-7-8-9-10-11-12 | 1-2-3-4-5-6-7-8-10-9-11-12 |
| 8 | 1-2-3-4-5-6-7-8-9-10-11-12 | 1-2-3-4-5-6-7-8-10-9-12-11 |
| 9 | 1-2-3-4-5-6-7-8-9-10-11-12 | 1-2-3-4-5-6-7-8-10-11-9-12 |
| 10 | 1-2-3-4-5-6-7-8-9-10-11-12 | 1-2-3-4-5-6-7-8-10-11-12-9 |
| 11 | 1-2-3-4-5-6-7-8-9-10-11-12 | 1-2-3-4-5-6-7-8-10-12-9-11 |
| 12 | 1-2-3-4-5-6-7-8-9-10-11-12 | 1-2-3-4-5-6-7-8-10-12-11-9 |
| . . . | | . . . |
| 239500800 | 1-2-3-4-5-6-7-8-9-10-11-12 | 7-8-9-10-11-12-1-2-3-4-5-6 |
| . . . | | |
| 479001584 | 1-2-3-4-5-6-7-8-9-10-11-12 | 12-11-10-9-8-7-6-5-3-4-2-1 |
| 479001585 | 1-2-3-4-5-6-7-8-9-10-11-12 | 12-11-10-9-8-7-6-5-4-1-2-3 |
| 479001586 | 1-2-3-4-5-6-7-8-9-10-11-12 | 12-11-10-9-8-7-6-5-4-1-3-2 |
| 479001587 | 1-2-3-4-5-6-7-8-9-10-11-12 | 12-11-10-9-8-7-6-5-4-2-1-3 |
| 479001598 | 1-2-3-4-5-6-7-8-9-10-11-12 | 12-11-10-9-8-7-6-5-4-2-3-1 |
| 479001599 | 1-2-3-4-5-6-7-8-9-10-11-12 | 12-11-10-9-8-7-6-5-4-3-1-2 |
| 479001600 | 1-2-3-4-5-6-7-8-9-10-11-12 | 12-11-10-9-8-7-6-5-4-3-2-1 |

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An optical cable including connectors, comprising:
a first set of waveguides and at least a second set of waveguides, wherein each waveguide of the first set of waveguides and the at least the second set of waveguides includes a plurality of optical channels encased in a polymer, each of the waveguides and the optical channels having a first end and a second end;
first and second connectors each including a plurality of electrically conductive pins, each of the plurality of optical channels of each of the waveguides, at their first and second ends, being connected to a specified pin on each of the first and second connectors, respectively, wherein a first central portion of each of the waveguides in the first set of waveguides is displaced in a first direction away from a substantially central longitudinal axis of the waveguides in the first set of waveguides, wherein the substantially central longitudinal axis traverses a substantially central bifurcation line of the first and second connectors connected to each of the plurality of optical channels at opposite ends of the waveguides in the first set of waveguides, and a second central portion of each of the waveguides in the at least the second set of waveguides is displaced in a second direction away from the substantially central longitudinal axis of the waveguides;
a first optical channel connection pattern on the first connector being formed by the first ends of the optical channels of the waveguides in the first set of waveguides and the at least the second set of waveguides being connected to the first connector;
a second optical channel connection pattern on the second connector being formed by the second ends of the optical channels of the waveguides in the first set of waveguides and the at least the second set of waveguides being connected to the second connector; and
the first optical channel connection pattern on the first connector being a different pattern than the second optical channel connection pattern on the second connector in relation to a connection hole pattern which is the same for both the first and second connectors wherein the connection hole pattern is formed from a plurality of holes in each of the first and second connectors wherein the plurality of holes house the electrically conductive pins, respectively.

2. The optical cable of claim 1, wherein the first and second connectors include rows and columns of connection holes.

3. The optical cable of claim 2, wherein the first and second connection patterns include respective first and second orders of the columns for the first and second connectors.

4. The optical cable of claim 1, wherein the first set of waveguides have specified optical channels connected to a plurality of pins in a column of the first connector and a sequential plurality of rows of the first connector, the first set of waveguides having the specified optical fibers connected to a plurality of pins in a corresponding column of the second connector and a sequential plurality of rows in the second connector, and
the at least the second set of waveguides having optical channels connected to a plurality of pins in the column of the first connector in a different sequential plurality of rows than the first connector, and the at least the second set of waveguides having the optical waveguide channels connected to a plurality of pins in the corresponding column of the second connector in a different sequential plurality of rows than the second connector of the first set of waveguides.

5. The optical cable of claim 1, wherein the first set of waveguides have specified optical channels at the first end connected to a plurality of pins in a column of the first connector in a first specified order of rows, the first set of waveguides having the specified optical waveguide channels at the second end connected to a corresponding column of the second connector in a second specified order of rows different from the first specified order.

6. The optical cable of claim 1, wherein each of the first and second central portions of the waveguides of the first set of waveguides and the at least the second set of waveguides are laterally displaced in mirror image relation to each other.

7. The optical cable of claim 1, wherein the first optical channel connection pattern on the first connector corresponds to a connection hole pattern on the first connector, and the second optical channel connection pattern on the second connector corresponds to a different connection hole pattern on the second connector, such that a first end of a waveguide from a first set of waveguides and at least the second set of the waveguides is connected to a column of first connection holes on the first connector having a spatial column placement on the first connector, and a second end of the waveguide from a first set of waveguides and at least the second set of the waveguides is connected to a column of second connection holes on the second connector having a spatial column placement different from the first connector wherein the first and second connector hole patterns are identical.

8. The optical cable of claim 1, wherein the first and second connectors include rows and columns of connection holes, and the first and second connection patterns include respective first and second orders of the columns for the first and second connectors, wherein the first optical channel connection pattern on the first connector includes the first ends of a first optical channel being connected to the holes of a first column on the first connector, and the second optical channel connection pattern on the second connector including the second ends of the first optical channel being connected to the holes of a second column on the second connector, wherein the first column on the first connector and the second column on the second connector are in a different spatial relation with respect to the connection hole pattern which is the same for both the first and second connectors.

9. The optical cable of claim 8, wherein the second column of the second connector is spatially displaced by one column in the connection hole pattern with respect to the connection hole pattern on the first connector.

* * * * *